United States Patent Office 3,301,037
Patented Jan. 31, 1967

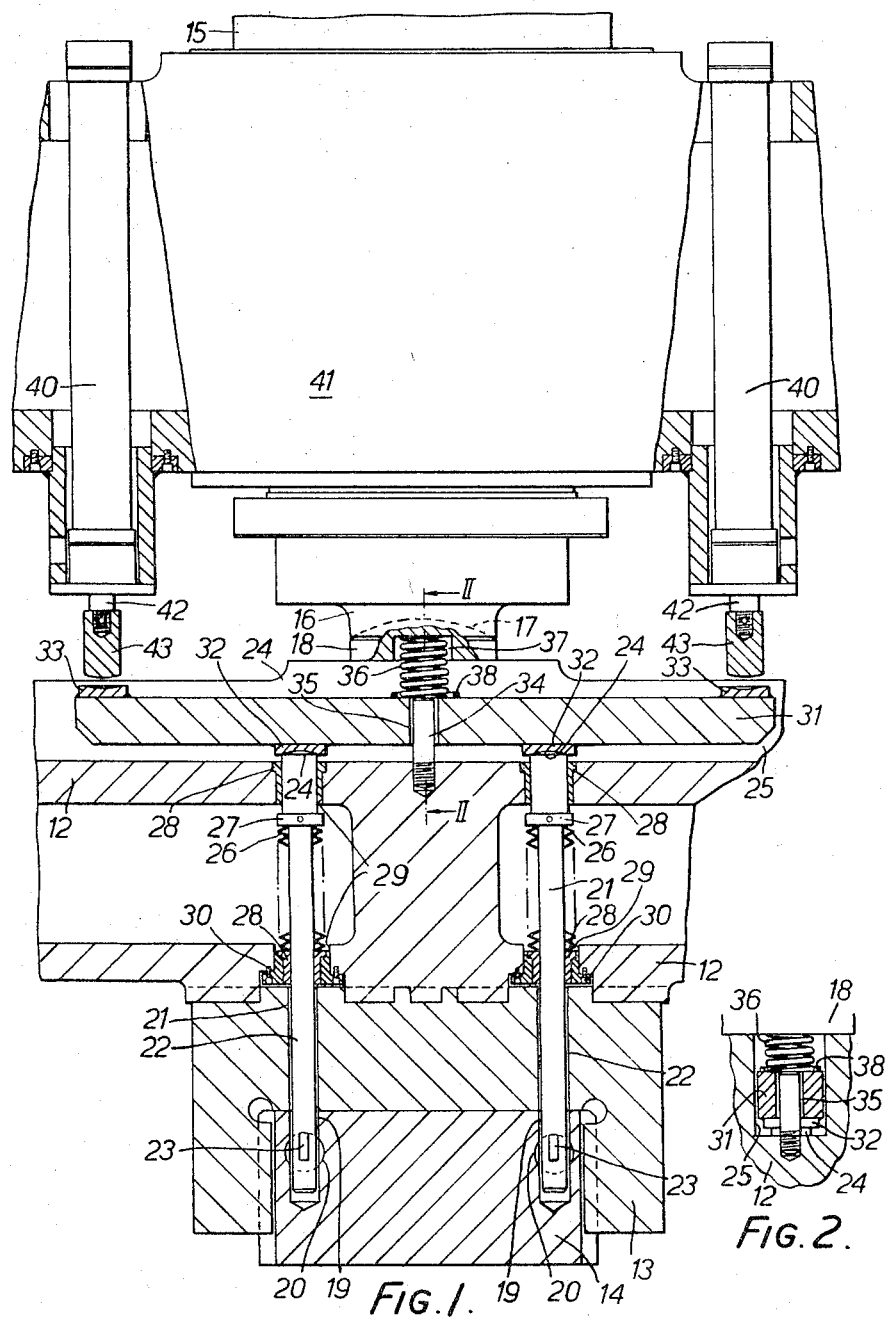

3,301,037
PRESS
Jack Herbert Beard, Sheffield, England, assignor to Davy and United Engineering Company Limited, Sheffield, England, a British company
Filed Sept. 24, 1964, Ser. No. 399,023
Claims priority, application Great Britain, Oct. 7, 1963, 39,396/63
9 Claims. (Cl. 72—481)

This invention relates to presses and in particular to a device for releasing the tool from a tool holder carried by the reciprocating crosshead of a push-down press.

The device is applicable to the type of tool holder having resilient means tending to retain a tool in the holder.

In one aspect the invention provides a push-down press having a reciprocable crosshead carrying a tool holder including resilient means arranged to tend to retain the tool in the holder, a tool releasing device, comprising a hydraulic assembly having a ram member and a cylinder member, one of which members is rigidly mounted on the press entablature and the other of which members is actuable, relative to the press entablature and to the crosshead, to oppose the resilient means.

Preferably said other member is actuable through a stroke greater than the press stroke.

In another aspect the invention provides a press comprising a reciprocable upper crosshead, means, having a stroke of a first length, for pushing the crosshead down for a press operation, tool clamping means for supporting a tool on the crosshead, the clamping means extending through the crosshead and being vertically reciprocable relative to the crosshead, resilient means for urging the clamping means into a tool clamping position, and means mounted on the press entablature actuable to oppose the resilient means.

An embodiment of releasing device for releasing the tool carried by the upper reciprocable crosshead of a forging press, in accordance with the invention, will now be described, by way of example only, with reference to the accompanying drawings of which:

FIGURE 1 is a sectional view of the upper part of a forging press, and

FIGURE 2 is a sectional view on the line II—II of FIGURE 1.

The upper crosshead 12 of the press carries a tool holder 13 in which is mounted a tool 14. The crosshead is driven down by cylinder 15 and ram 16 the recessed end of which bears against the upper curved surface 17 of the crosshead abutment 18.

The tool 14 is formed with two bores 19 extending vertically from its upper surface and aligned with vertical bores 22 in the tool holder and 29 in the crosshead. A pair of horizontal cross bores 20 connect with the bores 19 and open at the front and rear of the tool. A pair of rods 21 pass through bores 22 in the tool holder, and the lower end of each rod extends into one of the bores 19 and is formed with a slot in which a cotter pin 23 extending through the bore 20 is located to retain the tool attached to the rod.

Each rod passes through the tool holder and bushes 28 in the bores 29 of the crosshead so that its head 24 extends into a horizontally extending slot 25 in the upper surface of the crosshead, each rod being vertically reciprocable.

Around each rod 21 a disc spring is held in compression between a flange 27 on the rod and the lower bush 28 which is secured to the crosshead by screw 30. Each spring urges its associated rod upwards thus urging the cotter pins 23 against the upper surface of the bores 20 and maintaining the tool firmly in the tool holder.

An actuating bar 31, located in the slot 25 has bearing projections 32 on its bottom face arranged to bear against the heads 24 of the rods 21 and bearing projections 33, on the outer edges of its upper surface.

A pin 34 is screwed into the centre of the base of the slot 25 in the crosshead and projects upwards into a bore 35 of the actuating bar to prevent sideways movement of the actuating bar, which is vertically slidable on the pin.

A spring 36 is held in compression between the upper surface of the actuating bar and a recess 37 in the abutment 18 of the crosshead. The spring is coaxial with the pin 34, and its lower end is prevented from sideways movement by an upstanding lip 38 on the bar 31 around the bore 35. The spring 36 exerts considerably less force on the actuating bar than the upward force on the rods 21 exerted by springs 26.

The free movement of the actuating bar during forging is thus restrained by the sides of the slot 25, the pin 34 and the spring 36.

A pair of double acting ram and cylinder assemblies 40 are rigidly mounted on the press entablature 41 on opposite sides of the power cylinder 15. The rams 42 of these assemblies are movable through a stroke slightly exceeding the stroke of the power cylinder 15. The lower ends of the rams 42 carry abutment members 43 located above the projections 33 respectively.

During forging the release rams 42 are hydraulically held in their retracted position and the disc springs 26 provide the tool grip. To release the tool 14, it is lowered onto the bottom tool and the release rams 42 are then extended to push down the actuating bar until the projections 32 abut the bottom of slot 25. This pushes down the rods 21 against the action of the springs 26, releasing the load on the cotters 23, which may then be withdrawn by hand so that the top tool is released.

Since the cylinders of the piston and cylinder assemblies 40 are rigidly mounted on the press entablature it will be seen that no flexible coupling is necessary for the tool releasing mechanism.

In an alternative embodiment the actuating bar is replaced by a pair of bars pivotally mounted on the crosshead, the pivot points being on the opposite side of the rams 42 from the rods 22.

What is claimed is:

1. A pushdown press having a reciprocable crosshead carrying a tool holder including resilient means arranged to tend to retain the tool in the holder, a tool releasing device comprising a hydraulic assembly having a ram member and a cylinder member, one of which members is rigidly mounted on the press entablature and the other of which members is actuable, relative to the press entablature and to the crosshead, to oppose the resilient means.

2. A press comprising a reciprocable upper crosshead, means, having a stroke of a first length, for pushing the crosshead down for a press operation, tool clamping means for supporting a tool on the crosshead, the clamping means extending through the crosshead and being vertically reciprocable relative to the crosshead, resilient means for urging the clamping means into a tool clamping position, and releasing means mounted on the press entablature actuable to oppose the resilient means.

3. A press according to claim 2 in which the releasing means mounted on the press entablature comprise a pair of ram and cylinder assemblies, the movable members of which are movable through a stroke of a greater length than the first length.

4. A press according to claim 2 in which the clamping means comprises a plurality of rods, the lower ends of which are adapted to hold a tool, and including actuating means arranged to contact the upper ends of the rods and positioned beneath the releasing means.

5. A press according to claim 4 in which the actuating means comprises an actuating bar located in a horizontal groove in the upper surface of the crosshead, the actuating bar being vertically reciprocable through a predetermined distance and being restrained against horizontal movement.

6. A press according to claim 4 in which the lower ends of the clamping rods extend into vertical bores in the press tool and cotters extend through horizontal crossbores in the tube and engage the lower ends of the rods.

7. A press according to claim 4 including a tool-holder carried by the crosshead and adapted to receive a tool, the clamping rods passing through bores in the tool-holder.

8. A press according to claim 2 in which the resilient means comprise springs positioned to urge the clamping means upwards.

9. A press according to claim 5 including spring means between the actuating bar and the crosshead tending to urge the actuating bar down, the spring means having considerably less force than the resilient means.

No references cited.

WILLIAM W. DYER, JR., *Primary Examiner.*